(12) United States Patent
Sutardja et al.

(10) Patent No.: US 9,961,006 B1
(45) Date of Patent: May 1, 2018

(54) NETWORK SWITCH FOR TRANSMITTING DATA ACCORDING TO AN AUTO-NEGOTIATED DATA RATE

(71) Applicant: Marvell International Ltd., Hamilton (BM)

(72) Inventors: Sehat Sutardja, Los Altos Hills, CA (US); William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days. days.

(21) Appl. No.: 15/477,767

(22) Filed: Apr. 3, 2017

Related U.S. Application Data (63) Continuation of application No. 15/224,902, filed on Aug. 1, 2016, now Pat. No. 9,614,776, which is a
(Continued)

(51) Int. Cl.
*H04L 12/825* (2013.01)
*H04L 12/935* (2013.01)
(Continued)

(52) U.S. Cl.
CPC ............ *H04L 47/25* (2013.01); *H04J 3/18* (2013.01); *H04L 12/2874* (2013.01);
(Continued)

(58) Field of Classification Search
CPC .... H04W 24/00; H04L 43/50; H04L 43/0852; H04L 43/08; H04L 12/437;
(Continued)

(56) References Cited

U.S. PATENT DOCUMENTS

| 5,889,766 A | 3/1999 | Ohnishi et al. |
| 5,889,776 A | 3/1999 | Liang |

(Continued)

FOREIGN PATENT DOCUMENTS

| WO | WO-99/46867 A1 | 9/1999 |
| WO | WO-99/46879 A1 | 9/1999 |

(Continued)

OTHER PUBLICATIONS

IEEE Std 802.3-2002 (Revision of IEEE Std 802.3, 2000 Edition); 802.3 IEEE Standard for Information Technology—Telecommunications and information exchangebetween systems—Local and metropolitan area networks—Specific requirements; Part 3: Carrier sense multiple access with collision detection (CSMAICD) access method and physical layer specifications | IEEE Computer Society, Sponsored by the LAN/MANStandards Committee (pp. 1-552).
(Continued)

*Primary Examiner* — Brenda H Pham (57) ABSTRACT

A network switch includes a plurality of ports to communicate via a communication channel. Each of the plurality of ports includes an auto-negotiation circuit to negotiate a first data transmission rate with a network device in communication with the network switch via the communication channel, a transceiver circuit to receive, from the network switch, data via the communication channel at the negotiated first data transmission rate, and a transmitter/encoder circuit. The transmitter/encoder circuit is to receive the negotiated first data transmission rate from the auto-negotiation circuit, receive the data from the transceiver circuit, and selectively replicate portions of the data received from the transceiver circuit to transmit the data at a second data transmission rate that is different from the negotiated first data transmission rate.

17 Claims, 5 Drawing Sheets

Related U.S. Application Data continuation of application No. 14/138,569, filed on Dec. 23, 2013, now Pat. No. 9,407,562, which is a continuation of application No. 13/230,769, filed on Sep. 12, 2011, now Pat. No. 8,619,571, which is a continuation of application No. 12/723,915, filed on Mar. 15, 2010, now Pat. No. 8,018,962, which is a continuation of application No. 11/516,359, filed on Sep. 6, 2006, now Pat. No. 7,680,146, which is a continuation of application No. 10/892,356, filed on Jul. 16, 2004, now Pat. No. 7,173,942, which is a continuation of application No. 09/501,556, filed on Feb. 9, 2000, now Pat. No. 6,816,505.

(51) Int. Cl.
    *H04L 25/02* (2006.01)
    *H04L 12/931* (2013.01)
    *H04L 29/06* (2006.01)
    *H04J 3/18* (2006.01)
    *H04L 12/28* (2006.01)

(52) U.S. Cl.
    CPC ...... *H04L 25/0262* (2013.01); *H04L 49/3054* (2013.01); *H04L 49/351* (2013.01); *H04L 69/24* (2013.01)

(58) Field of Classification Search
    CPC .. H04B 17/003; H04J 3/085; H04J 2203/006; H04Q 11/0428; H04Q 11/0471; H04M 3/428; H04M 3/561; H04M 3/567
    USPC ................................ 370/252, 223, 264, 222
    See application file for complete search history.

(56) References Cited

U.S. PATENT DOCUMENTS

| | | | |
|---|---|---|---|
| 5,892,926 A | 4/1999 | Witkowski et al. | |
| 5,933,427 A | 8/1999 | Liang | |
| 5,991,303 A | 11/1999 | Mills | |
| 6,002,279 A | 12/1999 | Evans et al. | |
| 6,081,523 A | 6/2000 | Merchant et al. | |
| 6,094,439 A | 7/2000 | Krishna et al. | |
| 6,108,726 A | 8/2000 | Runaldue et al. | |
| 6,181,702 B1 | 1/2001 | Egbert | |
| 6,201,796 B1 | 3/2001 | Agazzi et al. | |
| 6,295,281 B1 | 9/2001 | Itkowsky et al. | |
| 6,330,278 B1 * | 12/2001 | Masters | H04L 1/0003 375/223 |
| 6,359,893 B1 | 3/2002 | Mills | |
| 6,385,208 B1 | 5/2002 | Findlater et al. | |
| 6,483,849 B1 | 11/2002 | Bray et al. | |
| 6,516,352 B1 | 2/2003 | Booth et al. | |
| 6,816,505 B1 | 11/2004 | Sutardja et al. | |
| 7,031,333 B1 | 4/2006 | Findlater et al. | |
| 7,173,942 B1 | 2/2007 | Sutardja et al. | |
| 7,680,146 B1 | 3/2010 | Sutardja et al. | |
| 8,018,962 B1 * | 9/2011 | Sutardja | H04L 49/3054 370/391 |
| 8,619,571 B1 * | 12/2013 | Sutardja | H04L 49/3054 370/232 |
| 9,407,562 B1 * | 8/2016 | Sutardja | H04L 49/3054 |
| 9,614,776 B1 * | 4/2017 | Sutardja | H04L 47/25 |
| 2002/0126684 A1 | 9/2002 | Findlater et al. | |
| 2002/0146043 A1 * | 10/2002 | McRobert | G01B 7/02 370/537 |

FOREIGN PATENT DOCUMENTS

| | | |
|---|---|---|
| WO | WO-00/27079 A1 | 5/2000 |
| WO | WO-00/28663 A2 | 5/2000 |
| WO | WO-00/28668 A1 | 5/2000 |
| WO | WO-00/28691 A2 | 5/2000 |
| WO | WO-00/28712 A2 | 5/2000 |
| WO | WO-00/35094 A1 | 6/2000 |

OTHER PUBLICATIONS

RMII Consortium, RMII Specification, AMD Inc., Broadcom Corp., National Semiconductor Corp., and Texas Instruments Inc., 1997, pp. 1-14 and Rev. A.
IEEE Standard 802.3,1988 Edition 22.1 and 35.1.
IEEE Std. 802.3, 1998 Edition, Part 3: Carrier sense multiple access with collision detection (CSMAICD) access method and physical layer specifications, New York, NY., pp. 1-1222.

* cited by examiner

NETWORK SWITCH FOR TRANSMITTING DATA ACCORDING TO AN AUTO-NEGOTIATED DATA RATE

CROSS-REFERENCE TO RELATED APPLICATIONS

The present disclosure is a continuation of U.S. patent application Ser. No. 15/224,902 (now U.S. Pat. No. 9,614,776), filed Aug. 1, 2016, which is a continuation of U.S. patent application Ser. No. 14/138,569 (now U.S. Pat. No. 9,407,562), filed on Dec. 23, 2013, which is a continuation of U.S. patent application Ser. No. 13/230,769 (now U.S. Pat. No. 8,619,571), filed on Sep. 12, 2011, which is a continuation of U.S. patent application Ser. No. 12/723,915 (now U.S. Pat. No. 8,018,962), filed on Mar. 15, 2010, which is a continuation of U.S. patent application Ser. No. 11/516,359 (now U.S. Pat. No. 7,680,146), filed on Sep. 6, 2006, which is a continuation of U.S. patent application Ser. No. 10/892,356 (now U.S. Pat. No. 7,173,942), filed on Jul. 16, 2004, which is a continuation of U.S. patent application Ser. No. 09/501,556 (now U.S. Pat. No. 6,816,505), filed on Feb. 9, 2000. The entire disclosures of the applications referenced above are incorporated herein by reference.

The inventors incorporate IEEE Standard 802.3 in its entirety herein by reference.

FIELD

This invention relates generally to an interface and switch for a high speed network, and more particularly to an interface and network switch capable of communicating at a nominal rate of up to 1 gigabit per second

DESCRIPTION OF THE RELATED ART

Interconnections of and communications among computers, peripheral devices, Internet appliances (generally referred to as network clients hereinbelow) via computer networks are ubiquitous. Moreover as applications such as, multimedia, require higher data transfer rates there is a need for more robust and faster networks.

Network switches facilitate interconnections and communications among networks and network clients. Conventional networks may utilize twisted pair cable such as Category 5 and operate at a data rate of either 10 megabits per second which generally complies with IEEE Standard 802.3, section 14, commonly known as 10 BASE-T, and 100 megabits per second which generally complies with IEEE Standard 802.3, sections 24 and 25, commonly known as 100 BASE-TX, the contents of each of which are incorporated herein by reference. As the demand for increased data transfer rates is required, a newer networking standard has been proposed that utilizes twisted pair cable and operates at a nominal data transfer rate of 1 gigabit per second (1000 megabits per second). The 1 gigabit per second transfer rate complies with IEEE Standard 802.3, section 40, commonly known as 1000 BASE-T, the contents of which are incorporated herein by reference.

Figure 1:
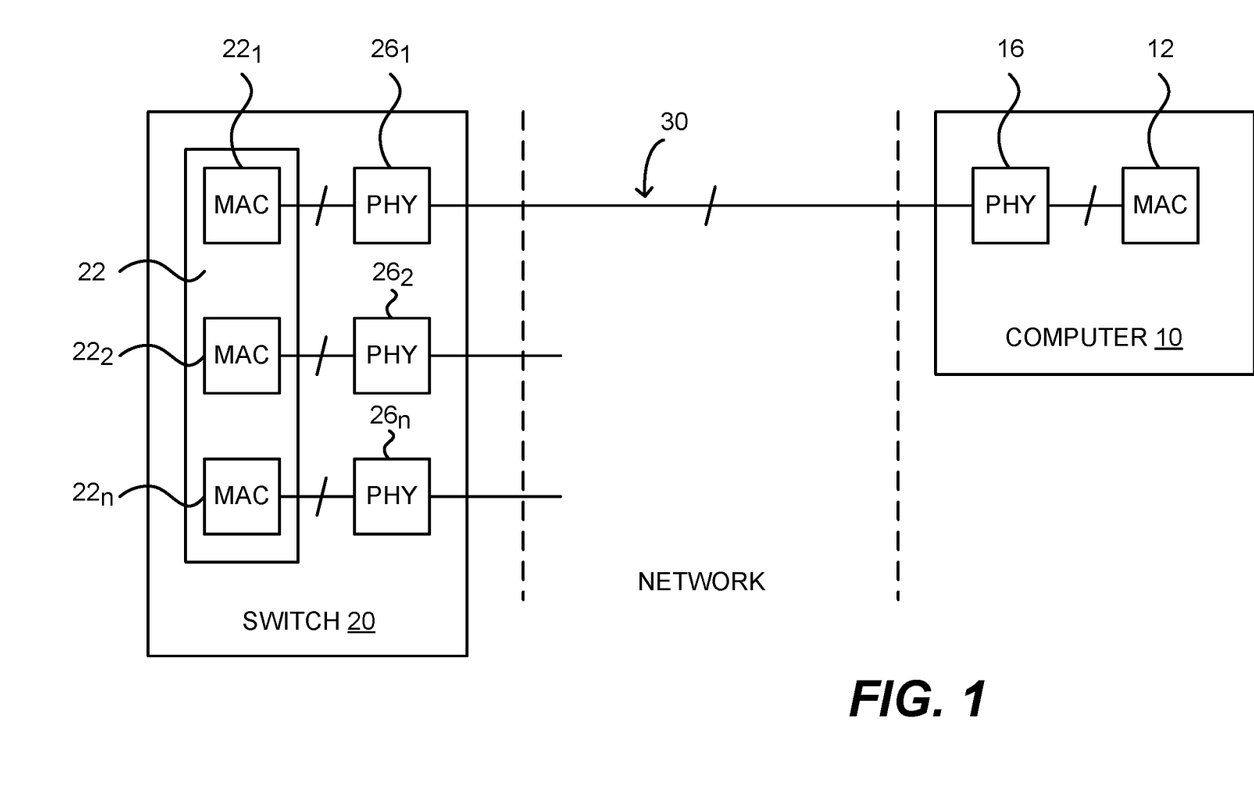
FIG. 1 is a schematic diagram of a conventional networking system.

FIG. 1 is schematic diagram of a typical networking system. As shown therein, a computer 10 is connected to a first port of switch 20 via a communications channel, such as, twisted pair cable 30. Switch 20 may comprise 24 ports, to allow computer 10 to communicate with other computers, peripherals, network appliances and other networks.

Computer 10 comprises a media access controller or MAC 12 and physical layer interface (PHY) or transceiver 16, which are connected to each other by an interface defined by, for example, the Media Independent Interface (MII) for 10 BASE-T standard and for 100 BASE-TX standard or the Gigabit Media Independent Interface (GMII) for 1000 BASE-T standard. MII for 10 BASE-T standard and for 100 BASE-TX standard are discussed at IEEE standard 802.3 section 22, the contents of which are incorporated herein by reference. The Gigabit Media Independent Interface (GMII) is defined by IEEE 802.3 section 35, the contents of which are incorporated herein by reference.

Media access controller 12 controls media access of transmitting and receiving packets to and from computer 10. Typically for gigabit level products, MAC 12 and PHY 16 are implemented as individual integrated circuits.

Switch 20 comprises MAC 22*n* and PHY 26*n*, which are respectively connected to each other in accordance with an interface as defined above. MAC 22*n* and PHY 26*n* are functionally similar to MAC 12 and PHY 16 of computer 10.

When the network is operated in accordance with 10 BASE-T or 100 BASE-TX the interface is defined in accordance with Media Independent Interface (MII). The MII passes data to and from the MAC 22*n* in 4 bit wide nibbles. The nibbles are converted to and from 10BASE-T or 100BASE-TX on the network side. When the network is operated at a higher transmission rate in accordance with 1000 BASE-T, the interface is defined by the GMII. In accordance with GMII, data is passed to and from the MAC 22*n* in 8 bit wide bytes. The bytes are converted to and from 1000BASE-T on the network side. Note that if fiber is used on the network side then the bytes are converted to and from 1000BASE-X on the network side. In other words, the MII/GMII provides a standard interface from a MAC to a transceiver regardless of the actual protocol used on the network side.

In a system that complies with 10 BASE-T, the MII requires 16 connection lines or pins connecting the integrated circuit embodying PHY 16 and PHY 26 to integrated circuit embodying MAC 12 and MAC 22, respectively. Similarly, in a system that complies with 100 BASE-TX 16 connection lines or pins are required. In a system that complies with 1000 BASE-T 24 connection lines or pins are required. The number of pins required for MAC 12 is not a problem because there is only one MAC and one PHY. On the other hand since there are n ports in switch 20, and since the n MAC 221-22*n* are typically fabricated as a single integrated circuit 22, the number of pins are 24×n. For example if there are 24 ports then the n MAC 22 requires 24×24 or 576 pins. The higher number of pins result in a larger die, a larger package, a more complicated integrated circuit and higher costs, particularly at the higher data transfer rates.

Various attempts have been made to solve the above-mentioned problems. Two ad hoc standards, namely Reduced Media Independent Interface (RMII) and Serial Media Independent Interface (SMII) reduce the number of pins by serialization techniques for 10 BASE-T and 100 BASE-TX. The RMII technique requires 7 pins per port and the frequency doubles from 25 MHz to 50 MHz. Thus for a 24 port switch 7×24 or 168 pins are required. The SMII technique requires 2 pins per port plus 1 synchronizing pin and the frequency increases 5 fold from 25 MHz to 125 MHz. In this technique 2×24+1 or 49 pins are required for the SMII technique. As will be appreciated by one of ordinary skill in the art, these techniques operate at frequencies in which clock recovery between PHY 26 and MAC 22 is not required.

The GMII interface consists of 24 pins operating at 125 Megabits per second. However, design of such circuit is difficult as the length of the traces and impedances between the traces must match for good signal integrity at this higher frequency. This results in a more costly and complicated integrated circuit.

An additional requirement of a network circuit operating at 1 gigabit per second is to be backward compatible with 10 BASE-T and 100 BASE-TX networks. That is, the network circuit must detect the maximum data transmission rate capability and set the transmission rate to that rate. For example, if computer 10 is capable of a maximum transmission rate of 100 Mb per second, switch 20 having a capability of 1 gigabit per second, must detect the 100 Mb per second rate and set the transmission rate of the port of switch 20 connect to computer 10 to 100 Mb per second. This feature is commonly known as auto-negotiation. The auto-negotiation feature is typically implemented in PHY 16 and PHY 26n. PHY 16 communicates the auto-negotiated data transmission rate to MAC 12 and PHY 26n communicates the auto-negotiated data transmission rate to MAC 22n.

Traditional techniques either requires higher pin counts and complicated board routing.

OBJECTS OF THE INVENTION

Therefore, it is an object of the present invention to overcome the aforementioned problems.

It is another object of the present invention to provide an interface between physical layer devices having data rates up to 1 gigabit per second.

It is a further object of the present invention to provide an interface between which reduces the number of pins or connections.

It is an additional object of the present invention to provide a system to efficiently control the auto-negotiated data rate.

SUMMARY

According to one aspect of the present invention, a network device is provided which comprises a first integrated circuit having fabricated thereon a media access controller and a first serializer interface in communication with said media access controller. A second integrated circuit is provided comprising a physical layer interface in communication with an external device and a second serializer interface in communication with physical layer interface and said first serializer interface. The first and second serializer interfaces comprise a fiber channel physical layer device implemented in accordance with 1000 BASE-X.

According to a second aspect of the present invention, the first serializer interface comprises a first receiver/decoder and a first transmitter/encoder, the second serializer interface comprises a second receiver/decoder and a second transmitter/encoder, and the first transmitter/encoder being in communication with the second receiver/decoder and the second transmitter/encoder being in communication with the first receiver/decoder.

In accordance with a third aspect of the present invention, the physical layer interface communicates with the external device at a selected one of plural data transmissions rates in accordance with a negotiated data transmission rate negotiated with the external device. The first transmitter/encoder communicates with the second receiver/decoder at a predetermined data transmission rate regardless of the negotiated transmission rate, and the second transmitter/encoder communicates with the first receiver/decoder at the predetermined data transmission rate regardless of the negotiated transmission rate.

In accordance with a fourth aspect of the present invention, the second integrated circuit further comprises a transceiver to communicate with the external device and an auto-negotiation circuit in communication with the transceiver. The auto-negotiation circuit negotiates the negotiated data transmission rate with the external device and provides a first control signal indicative of the negotiated data transmission rate to the second receiver/decoder and the second transmitter/encoder. If first control signal indicates that the negotiated data transmission rate is less than a specified data transmission rate, the second transmitter/encoder replicates data transmitted to the first receiver/decoder. The first receiver/decoder determines if any data received from the second transmitter/encoder has been replicated and provides a second control signal indicative of a received data transmission rate to the first transmitter/decoder. If the second control signal indicates that the first received data transmission rate is less than the specified data transmission rate, the first transmitter/encoder replicates data transmitted to the second receiver/decoder. The second receiver/decoder determines if any data received from the first transmitter/encoder has been replicated to determine the received data transmission rate and compares the received transmission rate with the first control signal. If the received data transmission rate is not equal to the negotiated data transmission rate, the second receiver/decoder provides a third control signal to the transceiver. The transceiver transmits idle data to the external device upon receipt of the third control signal.

In accordance with a fifth aspect of the present invention, the predetermined data transmission rate is 1.25 gigabits per second.

In accordance with a sixth aspect of the present invention, the physical layer interface is capable of communicating with the external device at a nominal data transmission rate of 1 gigabit per second.

In accordance with a seventh aspect of the present invention, a network switch is provided and comprises a first integrated circuit having a plurality of media access controllers and a plurality of first serializer interfaces, each in communication with a respective one of the plurality of media access controllers. A plurality of second integrated circuits are provide, each comprising a physical layer interface in communication with an external device, and a second serializer interface in communication with the physical layer interface and a corresponding one the first serializer interfaces.

In accordance with a eighth aspect of the present invention the first and second serializer interfaces comprise a fiber channel physical layer device implemented in accordance with 1000 BASE-X.

In accordance with a ninth aspect of the present invention, an integrated circuit comprises a media access controller and a serializer interface in communication with the media access controller and an external device. The serializer interface comprises a fiber channel physical layer device implemented in accordance with 1000 BASE-X.

In accordance with a tenth aspect of the present invention, an integrated circuit comprises a physical layer interface in communication with a first external device and a serializer interface in communication with the physical layer interface and a second external device. The serializer interface comprises a fiber channel physical layer device implemented in accordance with 1000 BASE-X.

Other objects and attainments together with a fuller understanding of the invention will become apparent and appreciated by referring to the following description and claims taken in conjunction with the accompanying drawings.

BRIEF DESCRIPTION OF DRAWINGS

In the drawings wherein like reference symbols refer to like parts.

DESCRIPTION

Figure 2:
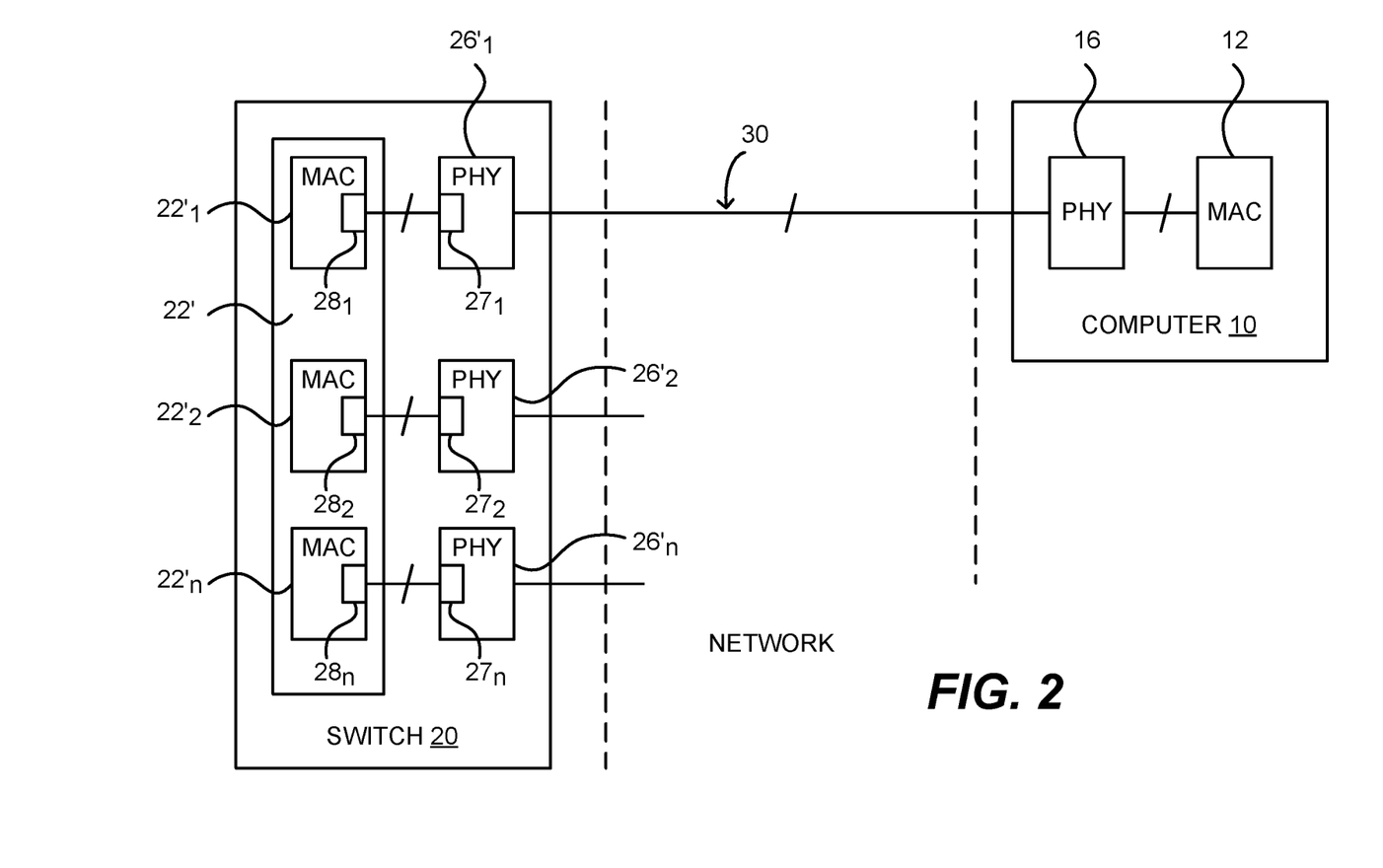
FIG. 2 is a schematic diagram of a networking system in accordance with a first embodiment of the present invention.

Referring to FIG. 2, shown therein is a preferred embodiment of the present invention. As shown therein, a computer 10 is connected to a first port of switch 20 via a communications channel, such as, twisted pair cable 30. Switch 20' may comprise 24 ports, to allow computer 10 to communicate with other computers, peripherals, network appliances and other networks.

Computer 10 comprises a media access controller or (MAC) 12 and physical layer interface (PHY) or transceiver 16, which are connected to each other in accordance with an interface, such as, MII or GMII discussed above. Media access controller 12, computer 10, and PHY 16 are similar to those described above, therefore no further discussion is provided herein. As will be appreciated by one of ordinary skill in the art, communication channel 30 may be implemented using a variety of techniques, for example wired, wireless, radio frequency, optical and the like.

Switch 20' comprises n ports. Each of the n ports comprises MAC $22'_n$ and PHY $26'_n$. PHY $26'_n$ comprises serializer interface $27_n$, and MAC $22'_n$ comprises serializer interface $28_n$, which are connected to each other to facilitate communication between MAC $22'_n$ and PHY $26'_n$. Serializer interfaces $28_1$-$28_n$ and MAC's $22'_1$-$22'_n$ are fabricated on a single integrated circuit. PHY $26'_n$ and serializer interface $27_n$ are fabricated on another integrated circuit. Serializer interfaces $27_n$ and $28_n$ have high bandwidth that can connected to each other using only a small number of wires, connections or pins for each transmit and receive link. In the preferred embodiment, serializer interfaces $27_n$ and $28_n$ are implemented in accordance with the fiber channel physical layer device standard as described in IEEE 802.3, section 36, commonly known as 1000 BASE-X. The contents of IEEE 802.3, section 36 are incorporated herein by reference.

Figure 3:
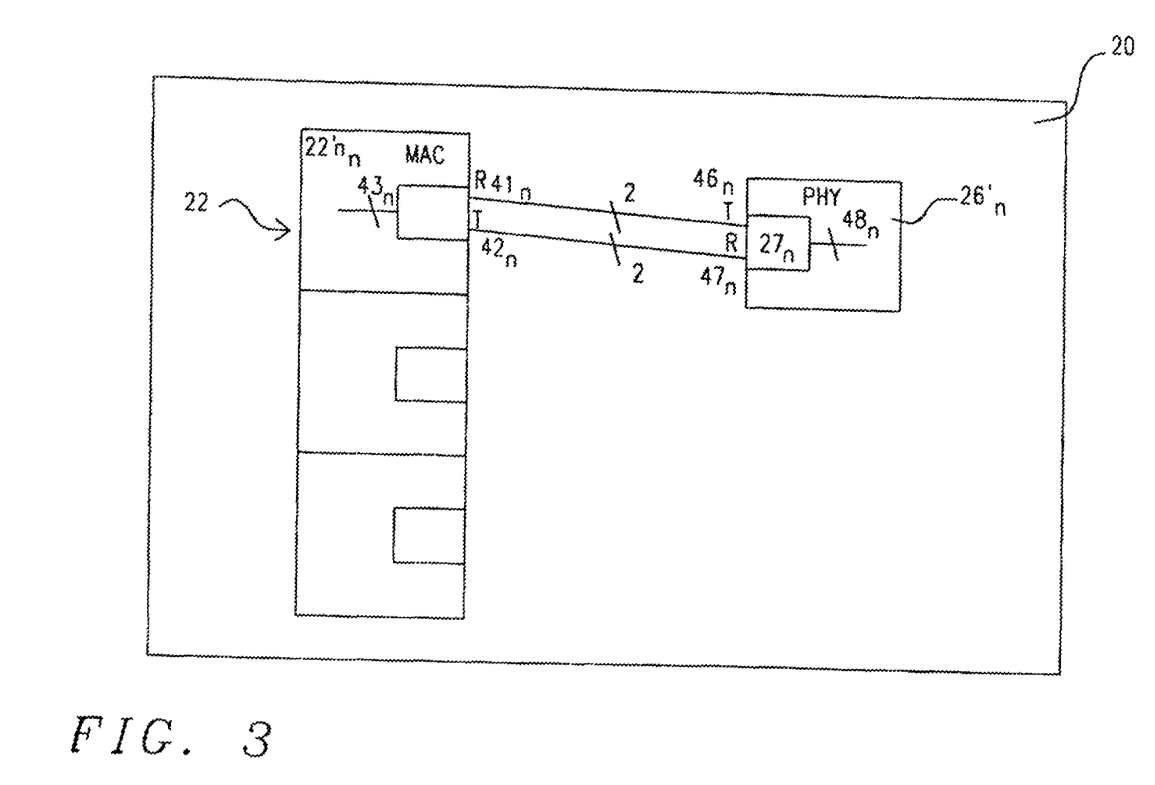
FIG. 3 is a more detailed schematic diagram of a media access controller (MAC) and PHY in accordance with the first embodiment of the present invention.

Referring now to FIG. 3, serializer interface $28_n$ comprises receive port $41_n$, transmit port $42_n$ and interface $43_n$. Port $41_n$ of serializer interface $28_n$ is connected to the transmit port $46_n$ of serializer interface $27_n$ by a pair of differential wires, and transmit port $42_n$ of serializer interface $28_n$ is connected to receive port $47_n$ of serializer interface $27_n$ by a pair of differential wires. Port $43_n$ is connected to MAC $22_n$ and port $48_n$ is connected to PHY $26'_n$.

In the preferred embodiment serializer interface $28_n$ requires only 4 pins, 2 pairs of differential wires or interconnections are required for each port. For a 24 port switch only 96 pins are required instead of the 576 pins required using conventional techniques.

Figure 4:
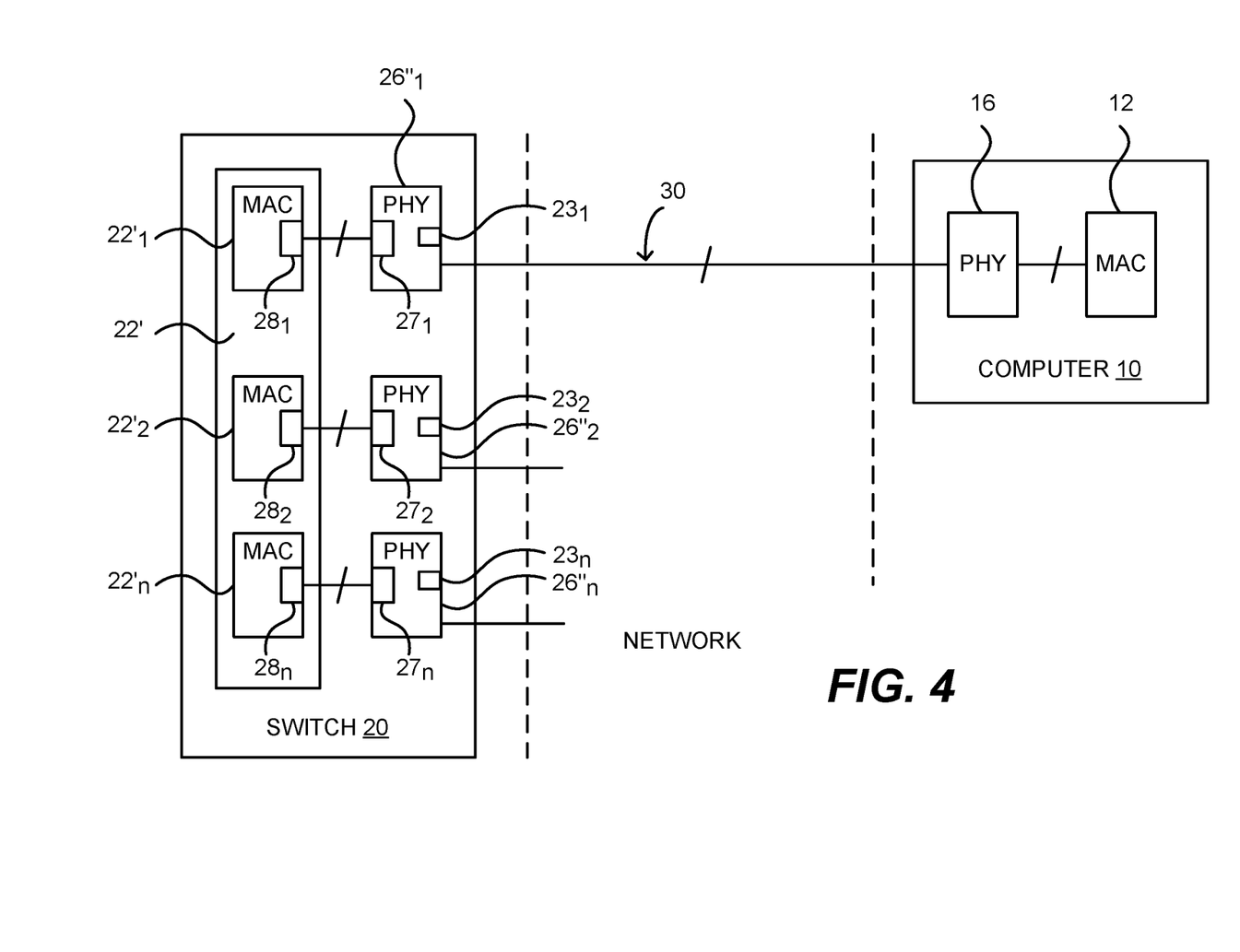
FIG. 4 is a more detailed schematic diagram of a media access controller (MAC) and PHY in accordance with a second embodiment of the present invention.

FIG. 4 is a schematic diagram of another embodiment of the present invention. The embodiment shown herein is similar to the embodiment shown in FIG. 2, however PHY $26''_n$ comprises a GMII standard interface $23_n$. In this configuration, PHY $26''_n$ can be connected to any GMII compliant device, which can facilitate communication between that device and either serializer interface $27_n$ or twisted pair cable 30.

The auto-negotiation feature will now be described below with reference to FIG. 5.

In accordance with any of the embodiments above, while switch 20' has the capability of communicating at nominally 1 gigabit per second, switch 20 must also be able to communicate at data rates of 10 Mbits per second and 100 Mbits per second, dependent on the network client connected thereto.

Figure 5:
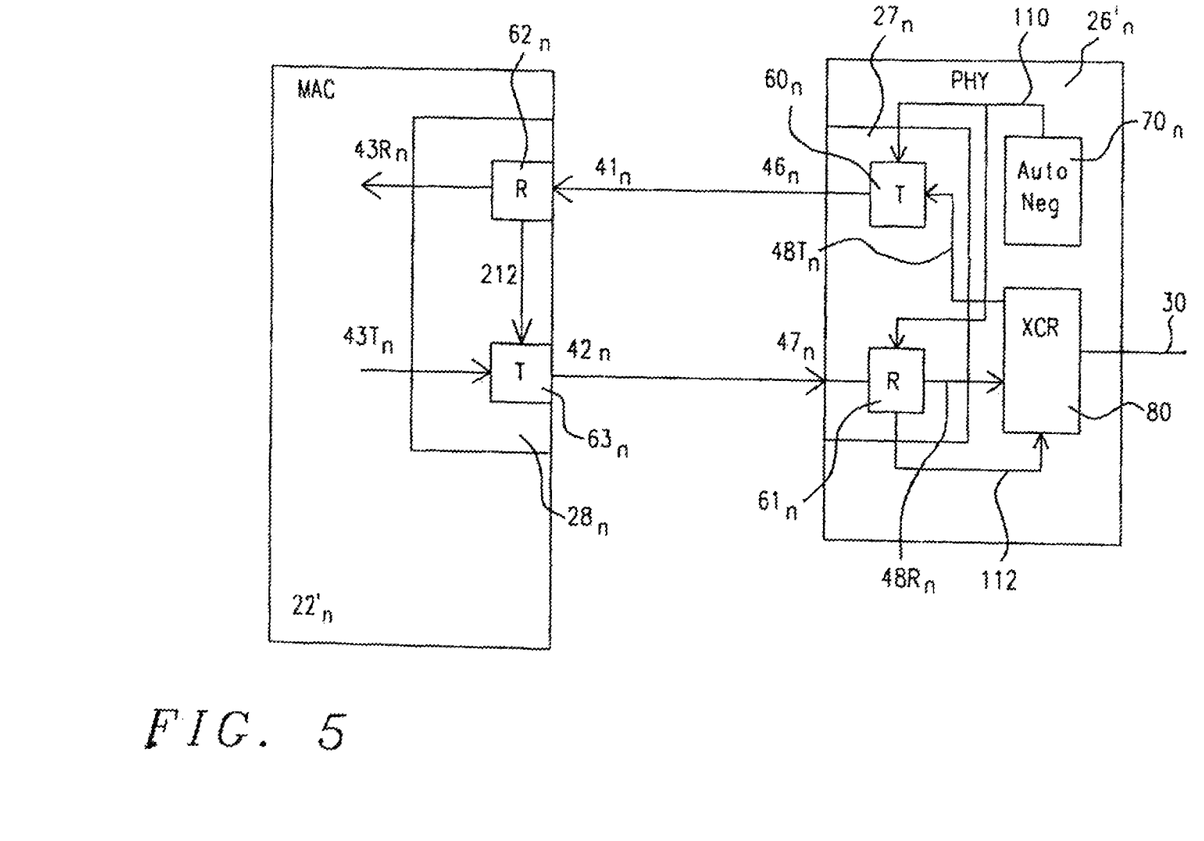
FIG. 5 is a more detailed schematic diagram illustrating auto-negotiation in accordance with the first embodiment of the present invention.

FIG. 5 is a schematic diagram of an embodiment capable communicating with a network client having a different data transmission rate. This embodiment generally comprises the same components as that of FIG. 2. More specifically, serializer interface $27_n$ comprises transmitter/encoder $60_n$ and receiver/decoder $61_n$ and serializer interface $28_n$ comprises transmitter/encoder $63_n$ and receiver/decoder $62_n$. Very generally, the principal of operation is as follows. Firstly, the data transmission rate between serializer interface $27_n$ and serializer interface $28_n$ is maintained at 1.25 gigabit per second, regardless of the data transmission rate between the network client and PHY $26'_n$. In operation, auto-negotiation circuit $70_n$ negotiates the data transmission rate with the network client using known techniques such as, standard IEEE 802.3, sections 28 and 40, the contents of which are incorporated by reference. The negotiated transmission rate is communicated to transmitter/encoder $60_n$ via control signal 110. If the data transmission rate is below the nominal 1 gigabit per second, transmitter/encoder $60_n$ will replicate data transmitted to serializer interface $28_n$, as explained in detail below, while the data transmission rate between from transmitter/encoder $60_n$ to serializer interface $28_n$ is maintained at 1.25 gigabit per second. In the serializer interface $28_n$, receiver/decoder $62_n$ monitors the data transmission and determines if data has been replicated. If no data has been replicated, the data transmission rate is 1.25 gigabit per second and no special processing is performed and all data is communicated with MAC $22'_n$. If receiver/decoder $62_n$ determines that data is being replicated, then the replicated data is ignored and not communicated to MAC $22'_n$. This feature allows switch 20' to communicate with network clients having a lower transmission rate without the need for costly and complicated circuits.

In a data communication system in accordance with 1000 BASE-X as described in IEEE 802.3, section 36, when there is no data to be transmitted, the transmitting component, for example $PHY_n$, sends an idle ordered set of data which consists of two alternating 10 bit code groups which are denoted as /K28.5/D16.2/. This ordered set is abbreviated as /I/. It is noted that the ordered set /K28.5/D5.6/ is occasionally utilized to maintain correct disparity. Also in accordance with 1000 BASE-X, when a packet is transmitted, the packet is delimited by a start of packet and end of packet delimiters which are abbreviated /S/ and /T/R/, respectively.

Receiver/decoder $62_n$ and receiver/decoder $61_n$ perform alignment of the bits stream into code-groups by searching for a comma pattern, namely, is 1100000 or 0011111. The comma pattern cannot be found in any code-group or within a concatenation of any combination, of code-groups except for the code-groups /K28.5/, /K28.1/, and /K28.7/. In the preferred embodiment the code groups /K28.1/ and /K28.7/ are not used. Hence alignment is performed during idles where the /K28.5/ code-group is present.

It is further noted that the /K28.5/ code-group is also used in other ordered sets to pass configuration information. For example /K28.5/D21.5/Dx.x/Dx.x/ is a valid configuration ordered set. In the preferred embodiment, receiver/decoder $62_n$ and $61_n$ ignore most of the ordered sets containing configuration information. This simplifies the design of receiver/decoders $62_n$, and $61_n$.

As noted above, the ordered set /K28.5/D5.6/ is occasionally utilized to maintain correct disparity. In general, the purpose of disparity is twofold. First, disparity is used to ensure that there will be equal numbers of 0's and 1's are transmitted over a short period of time to maintain DC balance regardless of the actual data within the packet. Second, disparity allows the receiver to detect the presence of errors that occurs over the transmission medium. Typically, for each code group there is two possible 10 bit sequences. One is transmitted when the disparity is positive, and the other when negative. (For some code-groups the same 10-bit sequence is used to for both positive and negative disparities.)

In the following discussion it is assumed that the signal flow is serializer interface $27_n$ to serializer interface $28_n$. The reverse process is used from the serializer interface $28_n$ to serializer interface $27_n$.

More specifically, in transmitter/encoder $60_n$ nibbles are replicated. Since the conversion into 1000BASE-X requires byte wide data while 10BASE-T/100BASE-TX passes data in nibble wide data, the upper four bits of the byte are padded with dummy bits by transmitter/encoder $60_n$. In 100BASE-TX the data is replicated 5 times and five bytes are transmitted from the 1000BASE-X for each 100BASE-TX nibble. In 10BASE-T the data is replicated 50 times.

In accordance with an alternative implementation of transmitter/encoder $60_n$, the upper bits are not padded but rather two nibbles are passed at a time. In this case the data is replicated 10 and 100 for 100 BASE-TX and 10 BASE-T times respectively. The advantage of this approach is that MAC $22'_n$ passes data in bytes regardless of the speed of operation.

Note that the /S/ code group must be transmitted 10 or 100 times for 100 BASE-TX and 10 BASE-T, respectively. In principle the /T/R/ and /I/ code-groups must be transmitted 10 or 100 times for 100 BASE-TX and 10 BASE-T, respectively. However in accordance with the present embodiment, latency can be shortened by transmitting the code groups 5 or 50 times, for 100 BASE-TX and 10 BASE-T, respectively.

In the present embodiment data is simply replicated as many times as needed and disparity is calculated once every 5 or 50 code groups for 100 BASE-TX and 10 BASE-T, respectively. In an alternate embodiment, disparity can also be calculated once every code group. This will allow a better short-term DC balance, but may complicate serializer interface $28_n$.

PHY $26'_n$ determines the data transmission rate of the network based on auto-negotiation. However the MAC $22'_n$ requires some time to receive the data from the PHY $26_n$ before it can respond. More specifically, auto-negotiation circuit $70_n$ negotiates the transmission data rate with the network client and sends a control signal 110 to transmitter/encoder $60_n$. As noted above, transmitter/encoder $60_n$ will either pass the data through or replicate bits in accordance with the detected data transmission rate, Receiver/decoder $62_n$ of serializer interface $28_n$ can sense the data transmission rate by counting the number of /K28.5/ it receives, as noted above. Receiver/decoder $62_n$ sends a control signal 212 to transmitter/encoder $63_n$. Receiver/decoder $61_n$ of serializer interface $27_n$ can sense the data transmission rate as noted above. Receiver/decoder $61_n$ then compares the data transmission rate it senses to the auto-negotiated data transmission rate from control signal 110. If the data transmission rates are different, then receiver/decoder $61_n$ sends control signal 112 to transceiver 80 to transmit idle bits. When the data transmission rates become the same, the control 112 then permits transceiver 80 to transmit data.

While the invention has been described in conjunction with several specific embodiments, it is evident to those skilled in the art that many further alternatives, modifications and variations will be apparent in light of the foregoing description. Moreover, it is contemplated that the present invention is not limited to the nominal 1 gigabit per second data transmission rate and above-described protocols, and may be implemented with other appropriate data transmission rates and protocols. Thus, the invention described herein is intended to embrace all such alternatives, modifications, applications and variations as may fall within the spirit and scope of the appended claims.

What is claimed is:

1. A network switch including a plurality of ports, each of the plurality of ports to communicate via a communication channel, each of the plurality of ports comprising:
    an auto-negotiation circuit to negotiate a first data transmission rate with a network device in communication with the network switch via the communication channel;
    a transceiver circuit to receive, from the network switch, data via the communication channel at the negotiated first data transmission rate; and
    a transmitter/encoder circuit to (i) receive the negotiated first data transmission rate from the auto-negotiation circuit, (ii) receive the data from the transceiver circuit, and (iii) selectively replicate portions of the data received from the transceiver circuit to transmit the data at a second data transmission rate that is different from the negotiated first data transmission rate.

2. The network switch of claim 1, further comprising a physical layer device, wherein the physical layer device includes the auto-negotiation circuit, the transceiver circuit, and the transmitter/encoder circuit.

3. The network switch of claim 2, further comprising a media access control device, wherein the transmitter/encoder circuit is further to transmit the data to the media access control device at the second data transmission rate.

4. The network switch of claim 3, wherein the media access control device comprises a receiver/decoder circuit to determine whether the transmitter/encoder circuit replicated the portions of the data received from the transceiver circuit.

5. The network switch of claim 1, wherein the second data transmission rate is greater than the negotiated first data transmission rate.

6. The network switch of claim 1, wherein, to selectively replicate the portions of the data, the transmitter/encoder circuit is further to replicate the portions of the data in response to a determination that the negotiated first data transmission rate is less than a threshold.

7. The network switch of claim 1, wherein, to selectively replicate the portions of the data, the transmitter/encoder circuit pads the data with dummy bits.

8. The network switch of claim 1, wherein, to selectively replicate the portions of the data, the transmitter/encoder circuit transmits the portions of the data more than one time.

9. The network switch of claim 1, wherein each of the plurality of ports further comprises a receiver/decoder circuit to selectively cause the transceiver to transmit idle bits on the communication channel in response to a determination that the second data transmission rate is different from the negotiated first data transmission rate.

10. A method for operating a network switch including a plurality of ports, each of the plurality of ports to communicate via a communication channel, the method comprising:
negotiating a first data transmission rate with a network device in communication with the network switch via the communication channel;
receiving, from the network switch, data via the communication channel at the negotiated first data transmission rate;
receiving the negotiated first data transmission rate; and
selectively replicating portions of the data to transmit the data at a second data transmission rate that is different from the negotiated first data transmission rate.

11. The method of claim 10, further comprising transmitting the data to a media access control device at the second data transmission rate.

12. The method of claim 11, further comprising determining, at the media access control device, whether the portions of the data were replicated.

13. The method of claim 10, wherein the second data transmission rate is greater than the negotiated first data transmission rate.

14. The method of claim 10, wherein selectively replicating the portions of the data includes replicating the portions of the data in response to a determination that the negotiated first data transmission rate is less than a threshold.

15. The method of claim 10, wherein selectively replicating the portions of the data includes padding the data with dummy bits.

16. The method of claim 10, wherein selectively replicating the portions of the data includes transmitting the portions of the data more than one time.

17. The method of claim 10, further comprising selectively transmitting idle bits on the communication channel in response to a determination that the second data transmission rate is different from the negotiated first data transmission rate.

* * * * *